US009619506B2

(12) United States Patent
Schefe et al.

(10) Patent No.: US 9,619,506 B2
(45) Date of Patent: Apr. 11, 2017

(54) METHOD AND SYSTEM TO AVOID DEADLOCKS DURING A LOG RECOVERY

(71) Applicants: Andre Schefe, Berlin (DE); Bernd Vorsprach, Berlin (DE); Henrik Hempelmann, Havelberg (DE); Martin E. Brunzema, Berlin (DE); Robin Wissbrock, Berlin (DE); Torsten Strahl, Kleinmachnow (DE)

(72) Inventors: Andre Schefe, Berlin (DE); Bernd Vorsprach, Berlin (DE); Henrik Hempelmann, Havelberg (DE); Martin E. Brunzema, Berlin (DE); Robin Wissbrock, Berlin (DE); Torsten Strahl, Kleinmachnow (DE)

(73) Assignee: SAP SE, Walldorf (DE)

( * ) Notice: Subject to any disclaimer, the term of this patent is extended or adjusted under 35 U.S.C. 154(b) by 157 days.

(21) Appl. No.: 14/552,744

(22) Filed: Nov. 25, 2014

(65) Prior Publication Data
US 2016/0147612 A1 May 26, 2016

(51) Int. Cl.
*G06F 11/14* (2006.01)
*G06F 17/30* (2006.01)

(52) U.S. Cl.
CPC .... *G06F 17/30371* (2013.01); *G06F 11/1469* (2013.01); *G06F 11/1471* (2013.01); *G06F 17/30368* (2013.01); *G06F 11/1458* (2013.01); *G06F 2201/80* (2013.01)

(58) Field of Classification Search
CPC ................. G06F 11/1458; G06F 11/1469
See application file for complete search history.

(56) References Cited

U.S. PATENT DOCUMENTS

| 5,369,757 A * | 11/1994 | Spiro | G06F 11/1471 714/19 |
| 5,381,545 A * | 1/1995 | Baker | G06F 11/1451 707/999.202 |
| 6,353,834 B1 * | 3/2002 | Wong | G06F 11/1471 707/799 |
| 2004/0177099 A1 * | 9/2004 | Ganesh | G06F 11/1471 |
| 2005/0131853 A1 * | 6/2005 | Sampath | G06F 11/1471 |
| 2006/0031267 A1 * | 2/2006 | Lim | G06F 11/1471 |

(Continued)

*Primary Examiner* — Joseph Schell
(74) *Attorney, Agent, or Firm* — Buckley, Maschoff & Talwalkar LLC

(57) ABSTRACT

A method, medium, and system to receive a request to perform a log recovery to restore multiple database services; determine log backup entries corresponding to a target log position for a first database service of the multiple database services; read from a sequential stream device, by the first database service, the log backup entries corresponding to the target log position for the first database service; inform a second database service of the multiple database services that the first database service has concluded executing the log backup entries corresponding to the target log position for the first database service from the sequential stream device; assuring that no resources of the streaming device are blocked by the first database service; and read log backup entries of the second database service corresponding to a target log position for the second database service from the sequential stream device.

20 Claims, 5 Drawing Sheets

(56) References Cited

U.S. PATENT DOCUMENTS

| | | | |
|---|---|---|---|
| 2012/0158664 A1* | 6/2012 | Anglin | G06F 17/3015 707/675 |
| 2014/0279920 A1* | 9/2014 | Madhavarapu | G06F 17/30283 707/649 |
| 2016/0147614 A1* | 5/2016 | Mittal | G06F 11/1469 707/615 |

\* cited by examiner

400

```
┌─────────────────────────────────────────────────┐
│   RECEIVE A REQUEST TO PERFORM A LOG RECOVERY TO │
│        RESTORE MULTIPLE DATABASE SERVICES        │
│                                            405   │
└─────────────────────────────────────────────────┘
                        │
                        ▼
┌─────────────────────────────────────────────────┐
│  DETERMINE LOG BACKUP ENTRIES CORRESPONDING      │
│  TO A TARGET LOG POSITION FOR A FIRST DATABASE   │
│   SERVICE OF THE MULTIPLE DATABASE SERVICES      │
│                                            410   │
└─────────────────────────────────────────────────┘
                        │
                        ▼
┌─────────────────────────────────────────────────┐
│       READ FROM A SEQUENTIAL STREAM DEVICE, BY   │
│       THE FIRST DATABASE SERVICE, THE LOG BACKUP │
│       ENTRIES CORRESPONDING TO THE TARGET LOG    │
│       POSITION FOR THE FIRST DATABASE SERVICE    │
│                                            415   │
└─────────────────────────────────────────────────┘
                        │
                        ▼
┌─────────────────────────────────────────────────┐
│       INFORM A SECOND DATABASE SERVICE OF THE    │
│       MULTIPLE DATABASE SERVICES THAT THE FIRST  │
│  DATABASE SERVICE HAS CONCLUDED READING THE LOG  │
│  BACKUP ENTRIES CORRESPONDING TO THE TARGET LOG  │
│     POSITION FOR THE FIRST DATABASE SERVICE FROM │
│             THE SEQUENTIAL STREAM DEVICE         │
│                                            420   │
└─────────────────────────────────────────────────┘
                        │
                        ▼
┌─────────────────────────────────────────────────┐
│     READ LOG BACKUP ENTRIES OF THE SECOND        │
│  DATABASE SERVICE CORRESPONDING TO A TARGET LOG  │
│   POSITION FOR THE SECOND DATABASE SERVICE FROM  │
│             THE SEQUENTIAL STREAM DEVICE         │
│                                            425   │
└─────────────────────────────────────────────────┘
```

*FIG. 4*

METHOD AND SYSTEM TO AVOID DEADLOCKS DURING A LOG RECOVERY

BACKGROUND

A distributed database may include multiple services and components that contribute to a unified, transaction consistent data set. The data of the database may, during normal operations, be periodically and automatically saved to a persistent storage. Furthermore, the persistent storage may be saved to one or more backup devices, services, or systems to protect the data against damage to the persistent storage and/or logical errors therein.

In some aspects, the database system may be called upon to restore the database system to an initial state, a most recent state, some past point in time, or to a specific data backup point. In some instances, a database system including multiple services and components sharing recovery devices (i.e., storage devices, mechanisms, and systems) may need to operate in a coordinated manner to ensure a restoration process executes accurately and completely.

In some contexts, such as a distributed database system sharing recovery devices, there may exist a desire to perform a recovery to a most recent state, some past point in time, or to a specific data backup point in an accurate and efficient manner.

BRIEF DESCRIPTION OF THE DRAWINGS

FIG. 4 is an illustrative flow diagram of a process, according to some embodiments.

DETAILED DESCRIPTION

The following description is provided to enable any person in the art to make and use the described embodiments. Various modifications, however, will remain readily apparent to those in the art.

Figure 1:
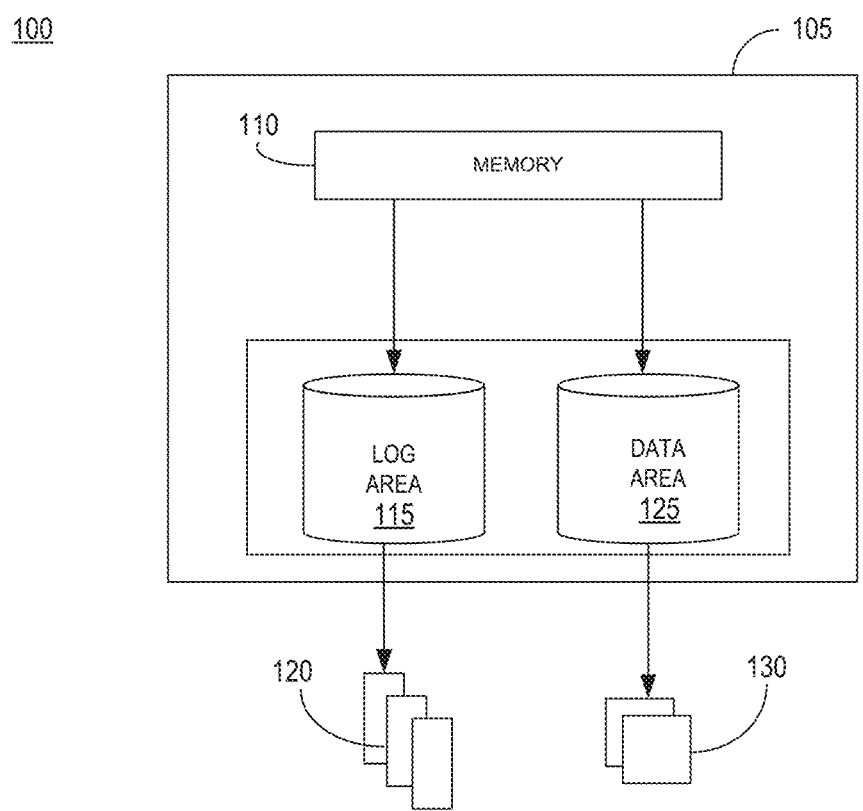
FIG. 1 is a schematic diagram of a logical architecture for a system, according to some embodiments.

FIG. 1 is a block diagram of a system 100, according to some embodiments. In some aspects, system 100 comprises a portion of a database system. According to some embodiments herein, system 100 may be a logical representation of some aspects of a distributed database system, including an implementation of a SAP HANA database system developed and provided by SAP SE. Database system 105 may implement an "in-memory" database, in which volatile (e.g., non-disk-based) memory 110 (e.g., Random Access Memory) is used both for cache memory and for storing the full database during operation, and persistent storage layer 150 including one or more fixed disks 115 and 120, flash memory, solid state storage device, etc. used for offline persistency and maintenance of database snapshots. Alternatively, memory 110 may be used as cache memory for storing recently-used data, while persistent storage layer 150 stores the full database. In some embodiments, the data of database system 105 comprises one or more of conventional tabular data, row-based data stored in row format, column-based data stored in columnar format, and object-based data. Database system 105 may also or alternatively support multi-tenancy by providing multiple logical database systems which are programmatically isolated from one another. Moreover, the data of database system 105 may be indexed and/or selectively replicated in an index to allow fast searching and retrieval thereof.

Data may, during normal operations of database system 105, be automatically saved from memory 110 to disk 125 at regular savepoints. Also, all data changes may be captured and written to disk 115 (i.e., log area) after each committed database transaction. The data area (disk 125) includes all data volumes, where each service of the database system has a data volume in some embodiments. The log area (disk 115) includes all redo log volumes, where each service of the database system has a log volume with persisted log segments in some embodiments.

In an effort to protect against disk failures, facilitate resetting the database to an earlier point in time, copy the database, and other scenarios, the data and logs from disks 125 and 115 may be written to data backups 130 and log backups 120, respectively. Data backups 130 may be performed manually or scheduled to contain the current data volumes (e.g., data and undo information) and log backups 120 may include the content of closed log segments and the backup catalog (i.e., redo information) that is saved automatically (asynchronously) when a log segment is full or at certain time intervals.

Figure 2:
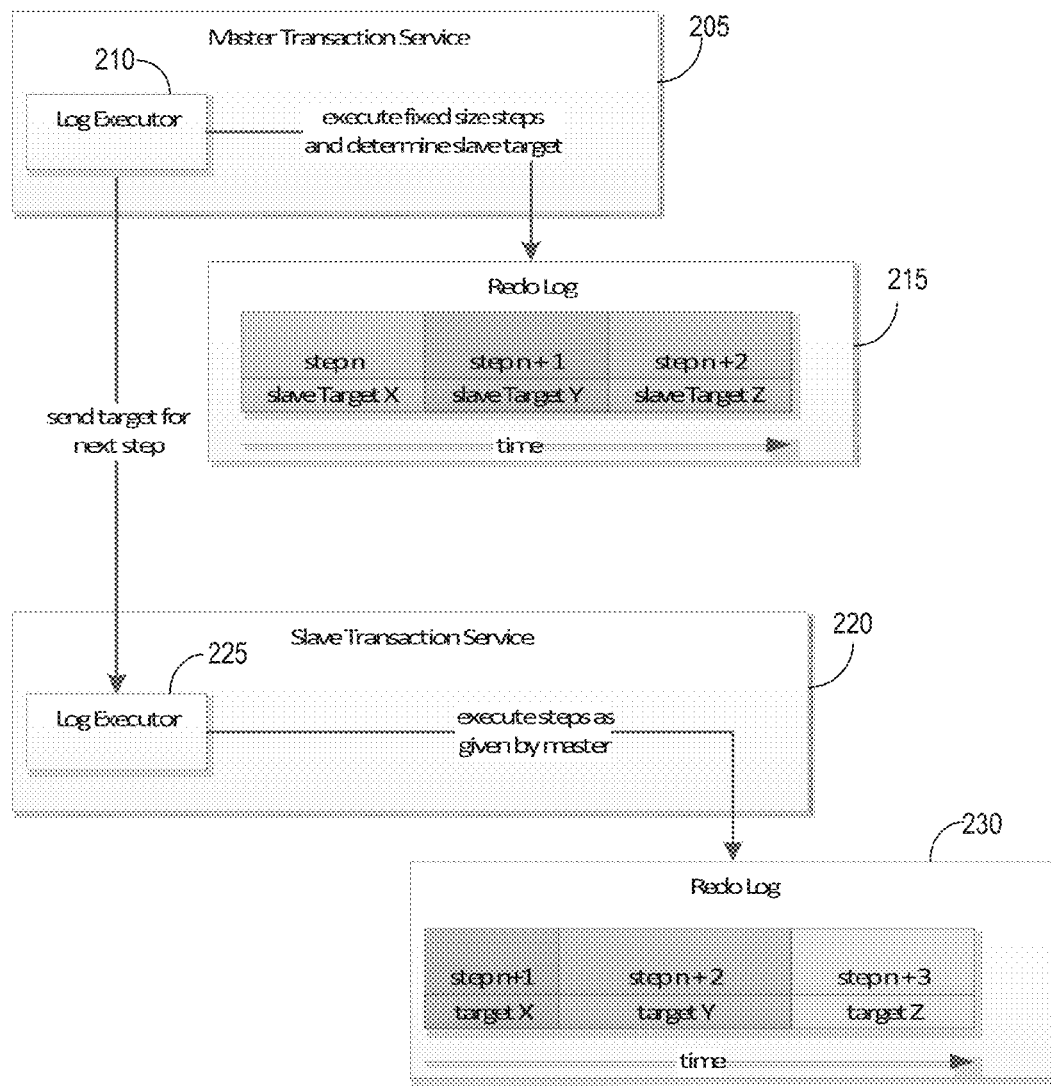
FIG. 2 is a schematic diagram of a logical architecture for some aspects of a system, according to some embodiments herein.

FIG. 2 is an illustrative schematic diagram of a system 200, according to some embodiments herein. In some aspects, FIG. 2 illustrates logical relationships between a log replay on a master transaction server 205 (e.g., a first service) and a child or slave (e.g., second) transaction service 220 during a log recovery process of a database system. During log recovery a database system such as, for example, an implementation of SAP HANA, the database system reads redo log entries from log backups. Each database transaction service reads its own stream of redo log entries 215 from a sequence of log backups for that particular service. In order to perform a point in time recovery, a log executor 210 of master transaction service 205 executes its redo log entries ahead of all other (slave/child) services in the same transaction domain, with a defined step size. For example, master transaction service 205 will read "step n" from redo log 215 before slave service 220 reads "step n+1" from its redo log 230. In some embodiments, the fixed size step of master transaction service 205 may be defined by a configuration setting of the database system.

During the recovery process, if master transaction service 205 reaches the end of a step (e.g., "step n"), then it determines the next target redo log entries (e.g., "slave target X") for all other (slave) services in the same transaction domain and sends an indication of the target for the next step to the log executor 225 of slave transaction service(s) 220. Log executor 225 of slave transaction service(s) 220 execute their redo log entries up to the given target (e.g., "X"), all in parallel to each other and to the next step (e.g., "step n+1") of the master transaction service. At the end of the next step ("step n+1"), master transaction service 205 waits for the completion of the steps of all slave services before proceeding with the execution of an additional recovery step.

As demonstrated by the foregoing description of FIG. 2, a number of dependencies exist on the database side of system 200 between the different streams read from the log backups. Accordingly, if a provider of the streams (e.g., a Backint for a SAP HANA implementation based on a sequential storage device such as a tape device) also introduces dependencies between the streams, then a deadlock situation may result. When accessing a common, shared sequential storage device such as a tape used to backup redo log entries, if one service is reading from the tape then no other service(s) can concurrently read backups from the tape.

In some aspects, the replay (i.e., executing) and the reading of the log backups are not synchronized. In some embodiments, the reading of the log entries and the executing of the log entries are decoupled from each other. In these situations, backup content may be read into a buffer without executing the backup content, wherein a log backup may be accessed and locked by a reader. As such, some backup content may not be executed since the service is stopped because the backup content is behind a current step. This stoppage is referred to herein as a deadlock.

Figure 3:
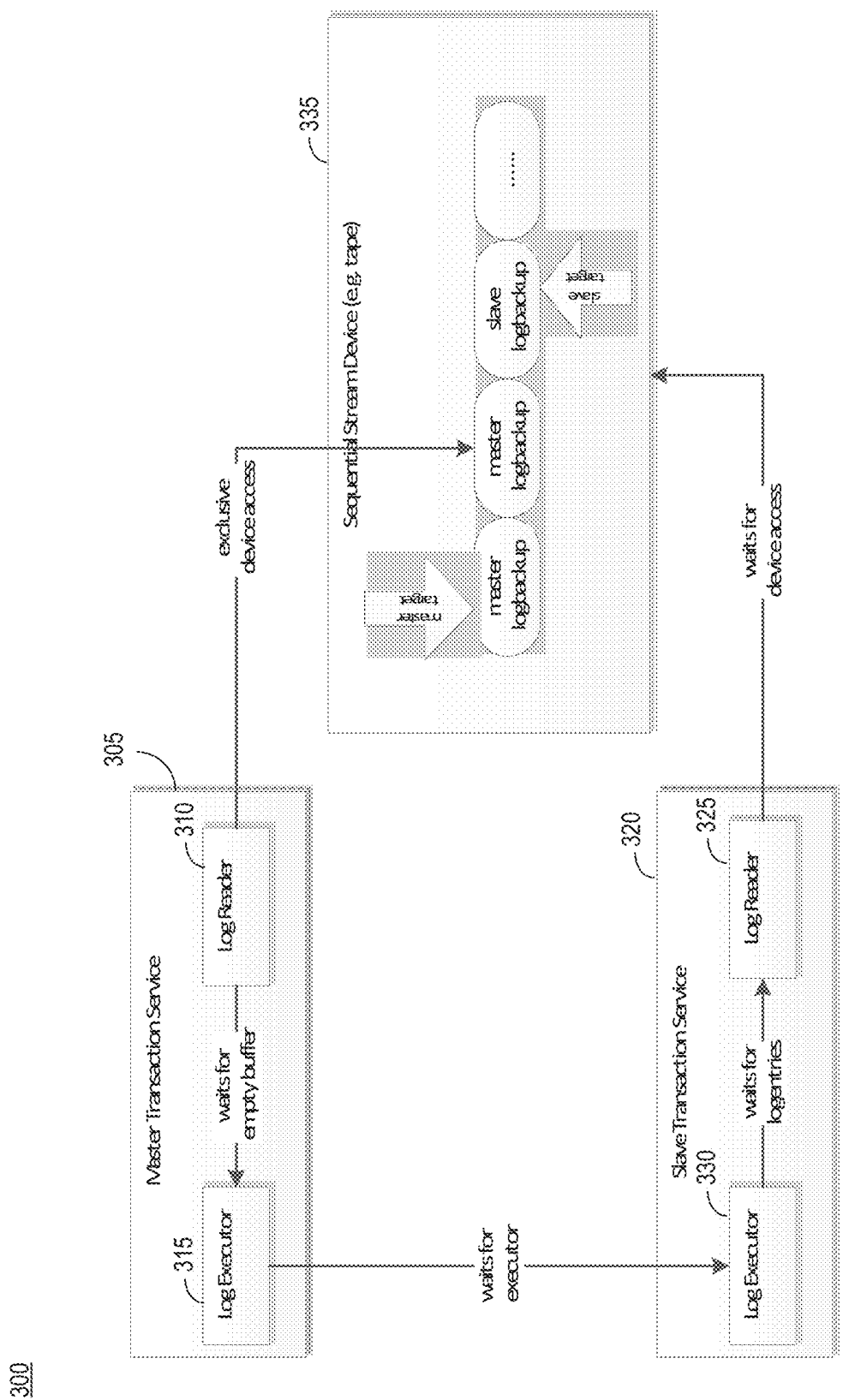
FIG. 3 is a schematic diagram of a logical architecture for some aspects of a system, according to some embodiments.

Referring to FIG. 3, a master transaction service 305 of database 300 executes all redo entries in a step thereof by log executor 315 according to some embodiments of a database system performing a log recovery process. Parallel to this operation, log reader 310 reads as many log entries as possible from a sequential storage device 335 (e.g., a tape device) and stops if no more space for read log entries is available at the master transaction service. While reading log entries from its backup, master transaction service 305 has exclusive access to the sequential stream device 335 and effectively blocks other services from accessing the sequential stream device, even though the other database transaction service(s) may need access to the sequential stream device used store the backups in order to perform the log recovery operation.

Notably, slave transaction service 320 executes its redo log entries by log executor 330 until all of the log entries that have already been read are processed. Then, slave transaction service 320 waits for its reader 325 to read more redo log entries up to its current target log position. However, log reader 325 may not be able to access the next log backup for this service (i.e., slave backup) since access to the sequential stream device 335 is blocked by log reader 310 of the master transaction service that is, as stated above, reading as many log entries as possible from a sequential storage device 335. Thus, an undesirable deadlock situation may occur, resulting in the halting of the log recovery process of the database system.

In accordance with some embodiments herein, a system, method, and medium storing processor-executable instructions thereon are disclosed that provide mechanisms to prevent a deadlock situation during a log recovery process of a database system sharing a sequential stream device amongst the database services of the database system. At a high level, the present disclosure generally relates to synchronizing operations of log executors and log readers of the database system in a prescribed manner such that a log reader will not have to wait (i.e., stop) for operations of a log executor. Accordingly, the present disclosure provides mechanisms for avoiding deadlocks during a log recovery when shared recovery devices are used between multiple database services.

In some aspects, processes disclosed herein may be viewed as transporting the target recovery positions from a log executor to a log reader. In this manner, the log reader may be informed of how much the log reader can actually read. Based on the knowledge of the target recovery positions from the log executor, the log reader herein may only read as far or as much as the log executor can guarantee it will be able to consume of read log entries.

Referring to FIG. 4, a process relating to providing a log recovery process for a distributed database system is disclosed. Process 400 may be implemented by a system, application, or apparatus configured to execute the operations of the disclosed process. In general, process 400 relates to a process to efficiently manage a log recovery process that avoids deadlocks during the log recovery when shared recovery devices are used between multiple database services. In some embodiments, various hardware elements of an apparatus, device or system embodying system 300, for example, executes program instructions to perform process 400. In some embodiments, hard-wired circuitry may be used in place of, or in combination with, program instructions for implementation of processes according to some embodiments. Program instructions that can be executed by a system, device, or apparatus to implement process 400 (and portions and/or other processes disclosed herein) may be stored on or otherwise embodied as non-transitory, tangible media. Embodiments are therefore not limited to any specific combination of hardware and software.

Prior to operation 405, services executing on a device or a server-side computing device (e.g., an application server) of a distributed database system may be developed and deployed.

At operation 405, a request to perform a log recovery to restore multiple database services may be received. The request may originate with an entity user such as a user-administrator providing support services for a user or group of users. In some embodiments, the request may be received as a consequence of a manual operation (e.g., an administrator would like to restore the database system to a particular point in time based on the log backups) or an automatic operation such as an automatic recovery to a particular savepoint in response to a failure or error in the persistence layer of the database.

At operation 410, at an initial point of the recovery process 400, a backup manager (or other entity) in the master transaction service (e.g., a master name service) determines log backup entries corresponding to a target log position for the master name (i.e., first database) service. It is noted that the master name service is one of the multiple database services (e.g., FIG. 3, database services 305 and 310) of the database instance performing the log recovery of process 400.

In some embodiments, the backup manager (or other device, component, or system) of the first database service (FIG. 3, 305) may calculate a recovery strategy for each of the multiple database services of the database system. In accordance with some aspects herein, the recovery strategy includes, for each database service, an indication of backup data and subsequent log backups for each service. Referring to FIG. 3, a backup manager of master transaction service 305 may accomplish this determination or calculation for slave transaction service 320. While the example of FIG. 3 includes two database services 305 and 320, more than two database services may be included without any loss of generality or applicability regarding the present disclosure. The two database service shown in FIG. 3 are provided to illustrate concepts, principles, and various aspects of the present disclosure in a concise, yet non-limiting manner.

In some aspects, the backup manager (or other device, component, or system) of the first database service (e.g., 305) may transfer the calculated recovery strategy for each of the multiple database services to each of the respective database services for which the calculation was performed.

In some aspects of the present disclosure, process 400 (or other processes incorporating some aspects thereof) may calculate the target log position for the first database service (e.g., 305) and send at least an indication of the target log position to a log reader of the first database service.

Operation 415 includes reading the log backup entries corresponding to the target position for the first database service from a sequential stream device by the first (or other) database service. In accordance with the present disclosure, the sequential stream device may comprise a tape device having the log backups of the multiple database services of the database system stored thereon. That is, the sequential stream device is a shared amongst the multiple database service.

In accordance with some aspects herein, access to the sequential stream device may be blocked to a second or other database services so long as a first database service is reading its log backup entries from the sequential stream device. In some aspects herein, the log entries are redo log entries in sequential stream device comprising the backup log storage mechanism.

In some aspects, a log executor of the first database service can directly execute the log backup entries corresponding to the target log position for the first database service. In response to being sent the target log position by the backup manager and thus informed of the target log position, the log reader can determine all log backups up to the one in which the target log position is located.

Operation 420 includes informing a second or other database service(s) (i.e. a child or slave transaction service) comprising the database system that the first database service has concluded executing the log backup entries corresponding to the target log position for the first database service from the sequential stream device. In some aspects, the first database service then releases an access to the sequential stream device, thereby allowing access thereto by other database services of the multiple database services.

Process 400 proceeds to operation 425 where log backup entries of the second database service corresponding to a target log position for the second database service are read from the sequential stream device. Access to the sequential stream device is not blocked since the first database service has completely read all of the log backup entries corresponding to the target log position and released the access to the device.

In some aspects, process 400 may be repeated for all recovery target log positions of a recovery process for all of the database services of the database system.

In some embodiments, only backup entries included in a current step (i.e., the target log position) of a database transaction service are read from a sequential stream device by the database transaction service. For example, a master transaction service may read one step ahead of the other database transaction services during a log recovery process. According to aspects of the present disclosure, the master transaction service will only read the log backups from the sequential stream device needed to recover the database service to the target log position. Accordingly, the master transaction service's exclusive access to the sequential stream device may be limited to reading the log entries specific to a current step or target log position. After the master transaction service has read the requisite log entries specific to recover the database service to the target log position, the master transaction service releases the sequential stream device. The master transaction service may further operate to signal a slave or other database transaction service(s) to perform a step of the log recovery process. The slave transaction service may be directed to only read the log entries specific and corresponding to a target log position of the slave transaction service.

In some embodiments, a target log position for a designated master transaction service may be determined or defined by a configuration file, setting, or parameter. In some embodiments, the target log position for the slave transaction service(s) may be determined or calculated by the master transaction service or a component thereof.

In some aspects, the replay and reading of log backups are decoupled. In some regards, the backup logs may be read into a buffer (i.e., an intermediate store) without executing the backup content. In such situations, a log reader of a database transaction service herein may read the log entries up to a current step and also a next "n" log backups ahead. In this instance "n" represents an additional number of log backups buffered by the logging component.

Figure 5:
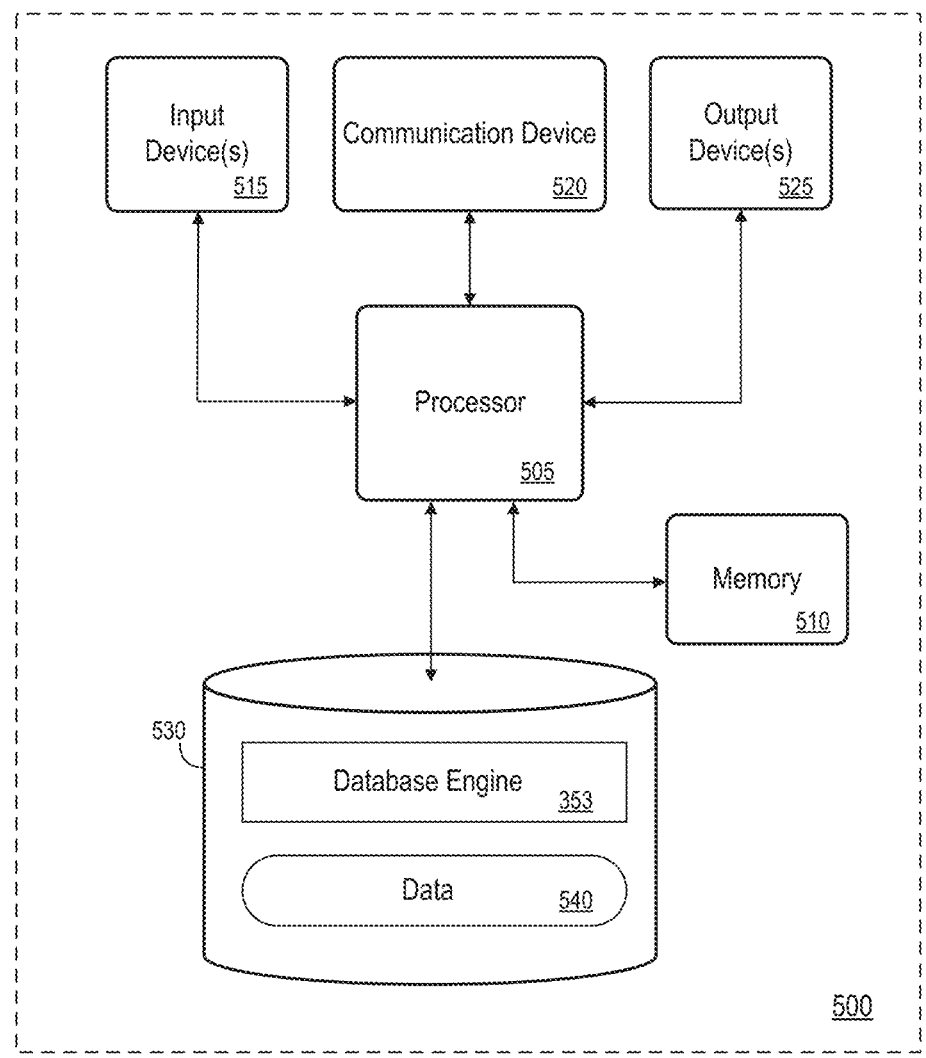
FIG. 5 is a block diagram of a computing device, in accordance with some embodiments.

FIG. 5 is a block diagram of a computing device, in accordance with some embodiments. System 500 may be, for example, associated with devices for implementing the processes disclosed herein. System 500 comprises a processor 505, such as one or more commercially available Central Processing Units (CPUs) in the form of one-chip microprocessors or a multi-core processor, coupled to a communication device 520 configured to communicate via a communication network (not shown in FIG. 5) to another device or system (e.g., an administrator device or a client device, not shown). System 500 may also include a cache 510, such as RAM memory modules. The system may further include an input device 515 (e.g., a touchscreen, mouse and/or keyboard to enter content) and an output device 525 (e.g., a touchscreen, a computer monitor to display, a LCD display).

Processor 505 communicates with a storage device 530. Storage device 530 may comprise any appropriate information storage device, including combinations of magnetic storage devices (e.g., a hard disk drive), optical storage devices, solid state drives, and/or semiconductor memory devices. In some embodiments, storage device 530 may comprise a database system, including in some configurations an in-memory database.

Storage device 530 may store program code or instructions to control an operation of database engine 535 to perform a recovery of a database having shared storage, in accordance with processes herein. Processor 505 may perform the instructions for implementing database engine 535 to thereby operate in accordance with any of the embodiments described herein. Database engine 535 may be stored in a compressed, uncompiled and/or encrypted format. Program instructions for database engine 535 may furthermore include other program elements, such as an operating system, a database reporting system, and/or device drivers used by the processor 505 to interface with, for example, a client, an administrator, and peripheral devices (not shown in FIG. 5). Storage device 530 may also include data 540. Data 540 may be used by system 500, in some aspects, in performing one or more of the processes herein, including individual processes, individual operations of those processes, and combinations of the individual processes and the individual process operations. For example, data 540 may comprise a persistence layer of a database system, in accordance with some embodiments herein.

All systems and processes discussed herein may be embodied in program code stored on one or more tangible, non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

In some embodiments, aspects herein may be implemented by an application, device, or system to manage recovery of an entity or other application in a consistent manner across different devices, effectively across an entire domain.

Although embodiments have been described with respect to certain contexts, some embodiments may be associated with other types of devices, systems, and configurations, either in part or whole, without any loss of generality.

The embodiments described herein are solely for the purpose of illustration. Those in the art will recognize other embodiments which may be practiced with modifications and alterations.

What is claimed is:

1. A method implemented by a computing system in response to execution of program instructions by a processor of the computing system, the method comprising:
   receiving a request to perform a log recovery to restore multiple database services;
   determining log backup entries corresponding to a target log position for a first database service of the multiple database services;
   reading from a sequential stream device, by the first database service, the log backup entries corresponding to the target log position for the first database service;
   informing a second database service of the multiple database services that the first database service has concluded executing the log backup entries corresponding to the target log position for the first database service from the sequential stream device;
   transporting target recovery positions from a log executor to a log reader to inform the log reader of how many log backup entries the log reader can read;
   preventing a deadlock that halts the log recovery by synchronizing operations of the log executor and the log reader so that the log reader does not wait for the log executor to stop its operations;
   the synchronizing causing the first database service to not block resources of the sequential stream device; and
   reading log backup entries of the second database service corresponding to a target log position for the second database service from the sequential stream device.

2. The method of claim 1, further comprising:
   calculating a recovery strategy for each of the multiple database services, the recovery strategy including, for each database service, an indication of backup data and subsequent log backups for each service; and
   transferring the calculated recovery strategy for each of the multiple database services to the respective database services.

3. The method of claim 1, further comprising:
   calculating the target log position for the first database service; and
   sending an indication of the target log position to a log reader of the first database service.

4. The method of claim 1, wherein a backup manager of the database system calculates a recovery strategy for each of the multiple database services.

5. The method of claim 1, wherein the log entries are redo log entries in a log backup storage mechanism.

6. The method of claim 1, wherein a log executor of the first database service can directly execute the log backup entries corresponding to the target log position for the first database service.

7. The method of claim 1, further comprising the first database service releasing an access to the sequential stream device to allow access thereto by other database services of the multiple database services.

8. The method of claim 1, wherein the sequential stream device comprises a tape storage device having multiple logs stored thereon corresponding to the multiple database services.

9. A non-transitory medium storing processor-executable program instructions, the medium comprising program instructions executable by a processor to:
   receive a request to perform a log recovery to restore multiple database services;
   determine log backup entries corresponding to a target log position for a first database service of the multiple database services;
   read from a sequential stream device, by the first database service, the log backup entries corresponding to the target log position for the first database service;
   inform a second database service of the multiple database services that the first database service has concluded reading the log backup entries corresponding to the target log position for the first database service from the sequential stream device;
   transport target recovery positions from a log executor to a log reader to inform the log reader of how many log backup entries the log reader can read;
   prevent a deadlock that halts the log recovery by synchronizing operations of the log executor and the log reader so that the log reader does not wait for the log executor to stop its operations;
   the synchronizing causing the first database service to not block resources of the sequential stream device; and
   read log backup entries of the second database service corresponding to a target log position for the second database service from the sequential stream device.

10. The medium of claim 9, further comprising program instructions executable by a processor to:
    calculate a recovery strategy for each of the multiple database services, the recovery strategy including, for each database service, an indication of backup data and subsequent log backups for each service; and
    transfer the calculated recovery strategy for each of the multiple database services to the respective database services.

11. The medium of claim 9, further comprising program instructions executable by a processor to:
    calculate the target log position for the first database service; and
    send an indication of the target log position to a log reader of the first database service.

12. The medium of claim 9, further comprising program instructions executable by a processor to instruct a backup manager of the database system to calculate a recovery strategy for each of the multiple database services.

13. The medium of claim 9, wherein the log entries are redo log entries in a log backup storage mechanism.

14. The medium of claim 9, wherein a log executor of the first database service can directly execute the log backup entries corresponding to the target log position for the first database service.

15. The medium of claim 9, further comprising program instructions executable by a processor to instruct the first database service to release an access to the sequential stream device to allow access thereto by other database services of the multiple database services.

16. The medium of claim 9, wherein the sequential stream device comprises a tape storage device having multiple logs stored thereon corresponding to the multiple database services.

17. A computing system comprising:
a memory storing processor-executable program code; and
a processor to execute the processor-executable program instructions in order to cause the computing system to:
receive a request to perform a log recovery to restore multiple database services;
determine log backup entries corresponding to a target log position for a first database service of the multiple database services;
read from a sequential stream device, by the first database service, the log backup entries corresponding to the target log position for the first database service;
inform a second database service of the multiple database services that the first database service has concluded reading the log backup entries corresponding to the target log position for the first database service from the sequential stream device;
transport target recovery positions from a log executor to a log reader to inform the log reader of how many log backup entries the log reader can read;
prevent a deadlock that halts the log recovery by synchronizing operations of the log executor and the log reader so that the log reader does not wait for the log executor to stop its operations;
the synchronizing causing the first database service to not block resources of the sequential stream device; and
read log backup entries of the second database service corresponding to a target log position for the second database service from the sequential stream device.

18. The system of claim 17, wherein the processor is further to execute the processor-executable instructions in order to cause the computing system to:
calculate a recovery strategy for each of the multiple database services, the recovery strategy including, for each database service, an indication of backup data and subsequent log backups for each service; and
transfer the calculated recovery strategy for each of the multiple database services to the respective database services.

19. The system of claim 17, wherein the processor is further to execute the processor-executable instructions in order to cause the computing system to:
calculate the target log position for the first database service; and
send an indication of the target log position to a log reader of the first database service.

20. The system of claim 17, wherein the sequential stream device comprises a tape storage device having multiple logs stored thereon corresponding to the multiple database services.

* * * * *